(12) United States Patent
Burke et al.

(10) Patent No.: US 7,547,051 B2
(45) Date of Patent: Jun. 16, 2009

(54) LOCKING SYSTEM FOR GRADE LEVEL ENCLOSURES

(75) Inventors: Edward J. Burke, Temecula, CA (US); Robert Gwillim, Murrieta, CA (US)

(73) Assignee: Channell Commercial Corporation, Temecula, CA (US)

( * ) Notice: Subject to any disclaimer, the term of this patent is extended or adjusted under 35 U.S.C. 154(b) by 0 days.

(21) Appl. No.: 11/373,615

(22) Filed: Mar. 9, 2006

(65) Prior Publication Data
US 2006/0201213 A1 Sep. 14, 2006

Related U.S. Application Data

(60) Provisional application No. 60/659,846, filed on Mar. 9, 2005.

(51) Int. Cl.
*E05C 3/04* (2006.01)
*E05C 19/18* (2006.01)
(52) U.S. Cl. ............... 292/206; 292/195; 292/212; 292/291; 292/301; 292/DIG. 11; 220/327
(58) Field of Classification Search ............ 292/44, 292/55, 194, 195, 202, 206, 212, 288, 291, 292/293, 294, 301, DIG. 11, DIG. 38, DIG. 63; 220/327
See application file for complete search history.

(56) References Cited

U.S. PATENT DOCUMENTS

| | | | | |
|---|---|---|---|---|
| 229,857 A | * | 7/1880 | Brainerd | .............. 292/202 |
| 589,780 A | * | 9/1897 | Howard | .............. 292/202 |
| 673,957 A | * | 5/1901 | Lang | .............. 292/212 |

(Continued)

FOREIGN PATENT DOCUMENTS

DE 70 34 179 12/1970

(Continued)

OTHER PUBLICATIONS

International Search Report dated Jul. 18, 2006, for corresponding PCT/US2006/008605, in the name of Channell Commercial Corporation.

*Primary Examiner*—Carlos Lugo
(74) *Attorney, Agent, or Firm*—Christie, Parker & Hale, LLP.

(57) ABSTRACT

A locking system for closing and locking a lid on an enclosure such as a grade level enclosure. The locking system includes a latch formed on an edge of a lid of the enclosure. The latch includes a bolt recess on an upper face of the lid which opens into a slotted wall structure that forms a passage below the lid. The bolt recess has a slotted opening which receives an L-bolt that extends down into a hollow interior of the slotted wall structure. A right angle leg on the L-bolt protrudes below the slotted wall structure when a fastener head atop the L-bolt rests in the bolt recess. The fastener head of the bolt in its at-rest position in the bolt recess provides access for rotating the L-bolt (and its right angle leg) with a tool that fits into the bolt recess to engage the fastener head. The bottom leg of the L-bolt, when rotated to its locked position, protrudes under a locking surface inside the enclosure. This releasably locks the lid to the enclosure.

13 Claims, 11 Drawing Sheets

U.S. PATENT DOCUMENTS

| | | | | |
|---|---|---|---|---|
| 1,163,397 A | * | 12/1915 | Ford | 292/202 |
| 1,170,094 A | * | 2/1916 | Neff | 292/212 |
| 1,203,885 A | * | 11/1916 | Lombard | 292/212 |
| 1,270,236 A | * | 6/1918 | Eckfeldt | 220/327 |
| 1,342,563 A | * | 6/1920 | More | 292/240 |
| 1,433,430 A | * | 10/1922 | Taylor | 292/212 |
| 1,604,330 A | * | 10/1926 | Witkowski | 292/204 |
| 1,684,983 A | * | 9/1928 | Clark | 292/304 |
| 1,878,544 A | * | 9/1932 | Schmidt | 292/218 |
| 2,034,472 A | * | 3/1936 | Kesslinger | 220/522 |
| 2,038,218 A | * | 4/1936 | Holt | 220/522 |
| 2,330,306 A | * | 9/1943 | Murphy | 220/327 |
| 2,420,478 A | | 5/1947 | Hasselhorn et al. | |
| 3,538,236 A | | 11/1970 | Baumgartner | |
| 3,618,275 A | | 11/1971 | Ance et al. | |
| 3,929,360 A | * | 12/1975 | Gulistan | 292/67 |
| 3,952,908 A | | 4/1976 | Carson | |
| 3,985,258 A | | 10/1976 | Quigley et al. | |
| 4,158,102 A | | 6/1979 | Bright | |
| 4,163,503 A | | 8/1979 | McKinnon | |
| 4,186,952 A | * | 2/1980 | Glass | 292/202 |
| D257,133 S | * | 9/1980 | McKinnon | D10/103 |
| 4,365,108 A | | 12/1982 | Bright | |
| 4,443,654 A | | 4/1984 | Flachbarth et al. | |
| 4,864,467 A | | 9/1989 | Byrd et al. | |
| 4,967,944 A | * | 11/1990 | Waters | 224/404 |
| 5,401,902 A | | 3/1995 | Middlebrook et al. | |
| 5,627,340 A | | 5/1997 | Smith et al. | |
| 5,791,098 A | | 8/1998 | Thomas | |
| 6,073,792 A | * | 6/2000 | Campbell et al. | 220/284 |
| 6,357,804 B1 | * | 3/2002 | Bernier et al. | 292/114 |
| 6,362,419 B1 | | 3/2002 | Gallagher et al. | |
| 6,455,772 B1 | | 9/2002 | Leschinger et al. | |
| 6,568,226 B1 | * | 5/2003 | Ramsauer | 70/127 |
| 6,648,349 B1 | * | 11/2003 | Waller et al. | 280/47.35 |
| 6,667,437 B2 | | 12/2003 | Schenk | |
| 6,676,176 B1 | * | 1/2004 | Quandt | 292/202 |
| 6,698,853 B2 | * | 3/2004 | Chen et al. | 312/263 |
| 6,851,567 B2 | * | 2/2005 | McKinnon | 220/254.3 |
| 6,881,898 B2 | * | 4/2005 | Baker et al. | 174/50 |
| 6,953,209 B2 | * | 10/2005 | Jackson et al. | 292/66 |
| 7,030,315 B1 | | 4/2006 | Dunn et al. | |
| 7,038,127 B2 | | 5/2006 | Harwood | |
| 2006/0070762 A1 | * | 4/2006 | Lazzaro et al. | 174/50 |
| 2006/0090917 A1 | * | 5/2006 | Lowe et al. | 174/50 |
| 2006/0254794 A1 | | 11/2006 | Burke et al. | |

FOREIGN PATENT DOCUMENTS

| | | |
|---|---|---|
| EP | 1 467 454 A1 | 10/2004 |
| FR | 2 330 177 | 5/1977 |

\* cited by examiner

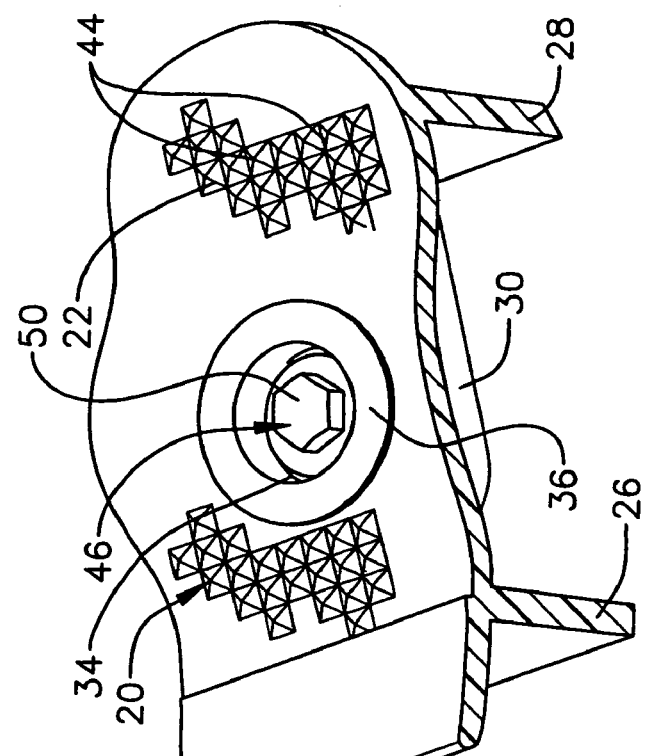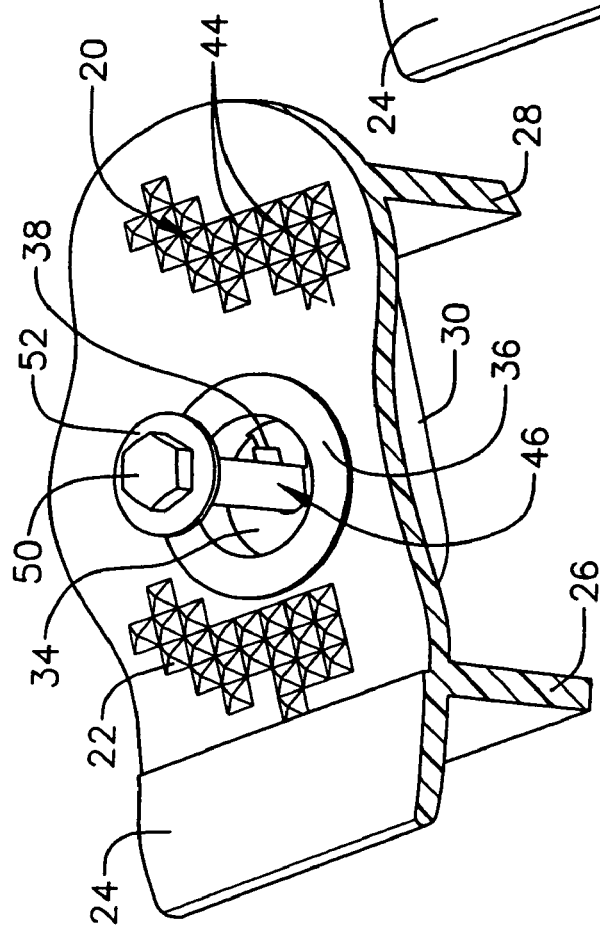

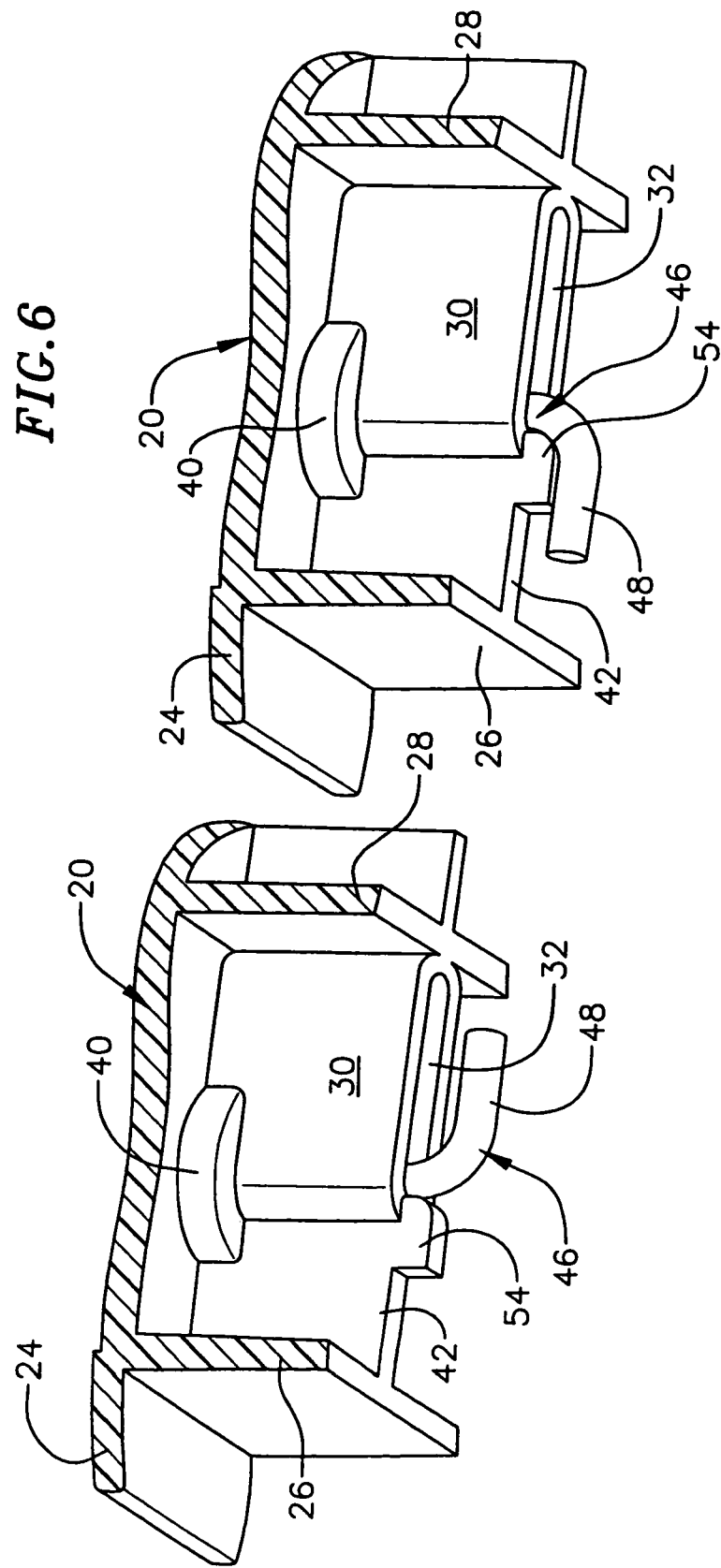

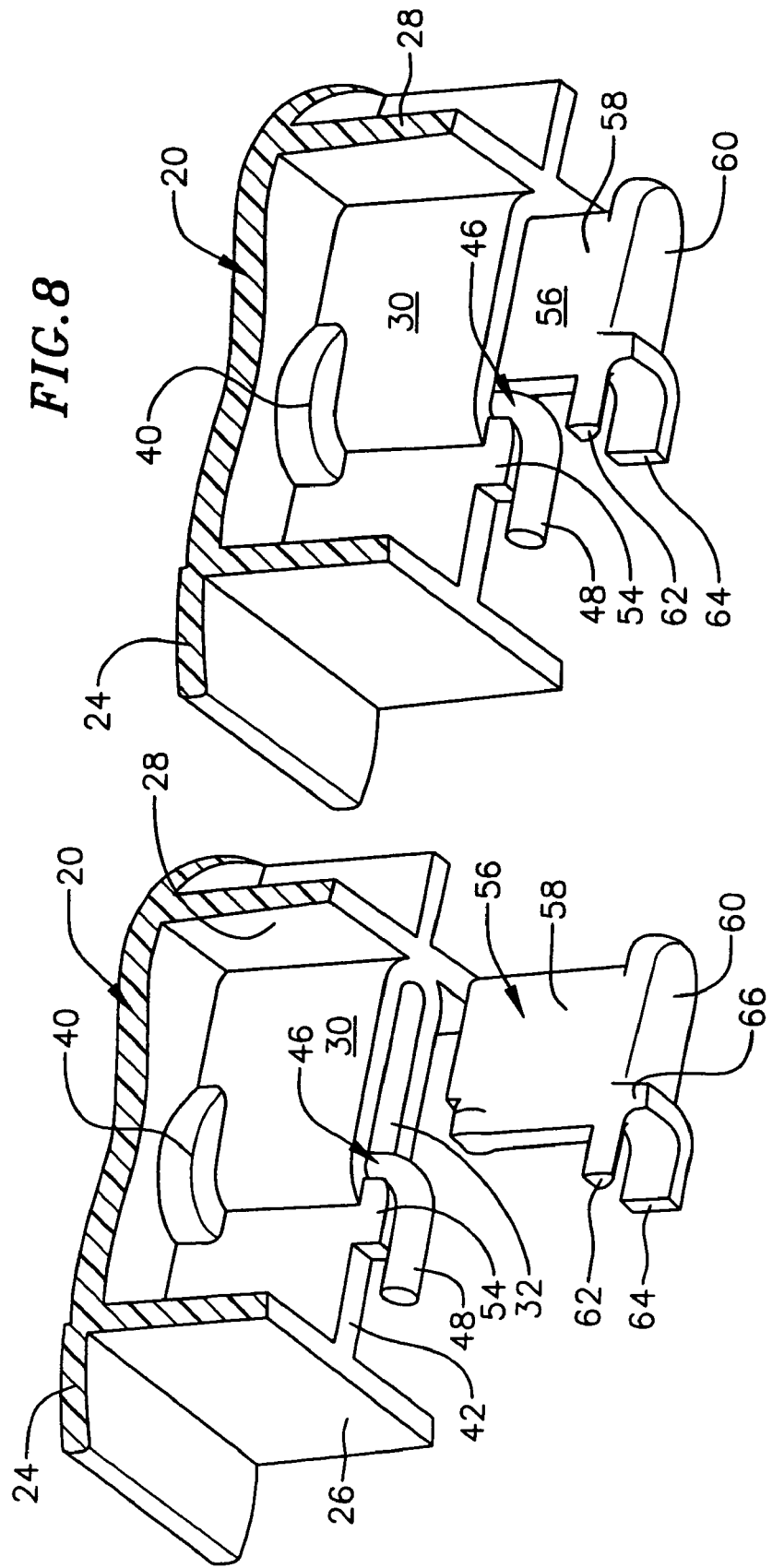

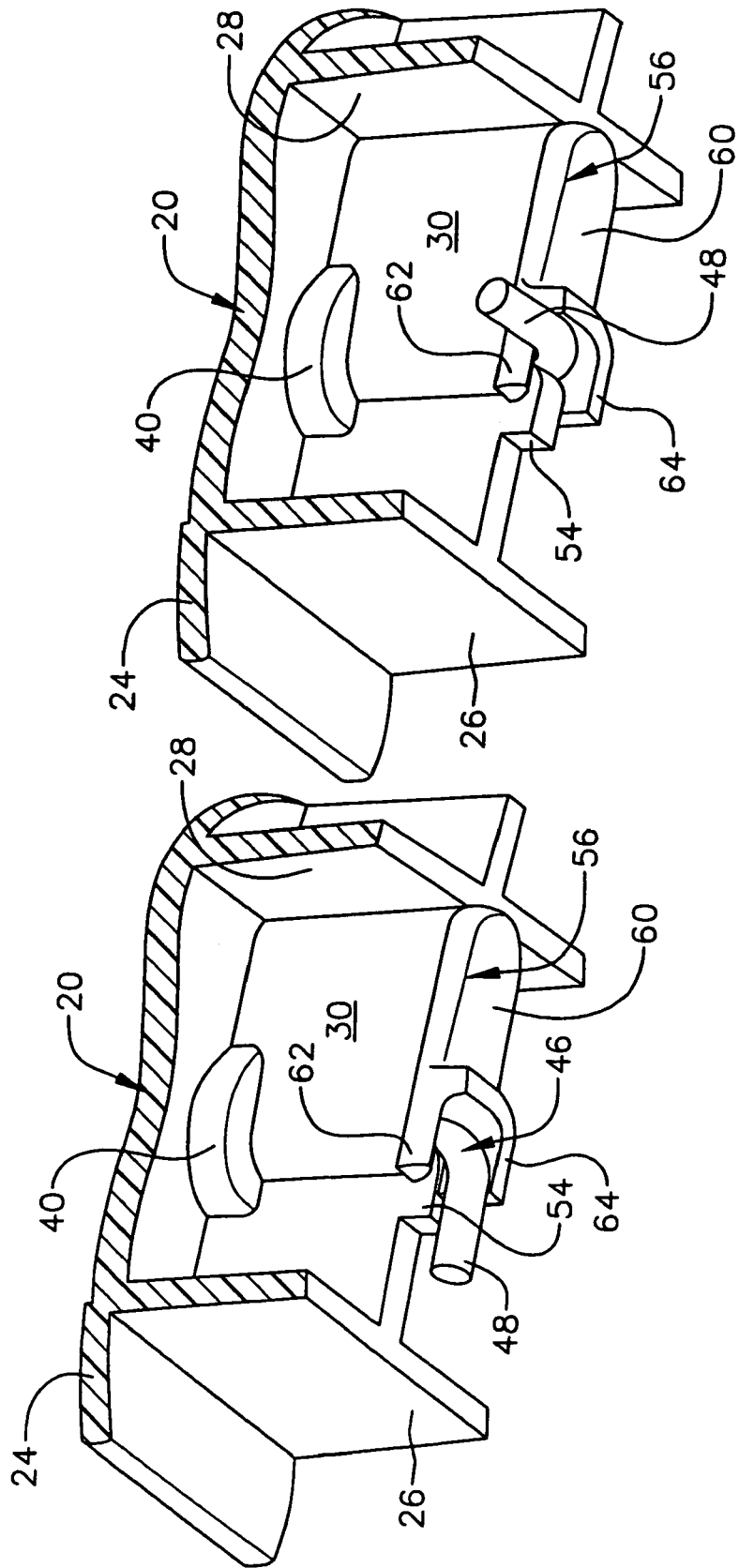

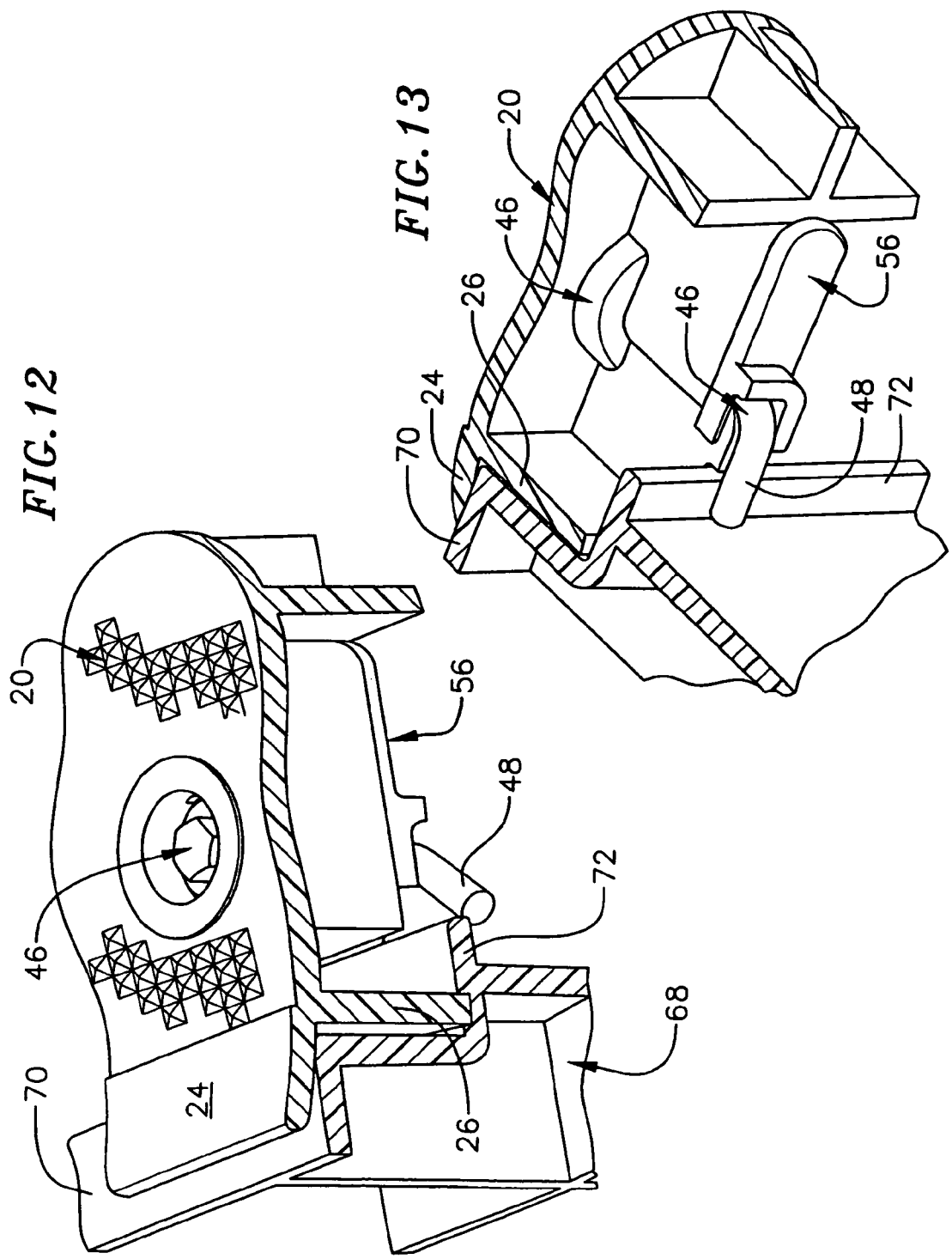

LOCKING SYSTEM FOR GRADE LEVEL ENCLOSURES

CROSS-REFERENCE TO RELATED APPLICATION

This application claims priority to Provisional Application 60/659,846, filed Mar. 9, 2005, the entire disclosure of which is incorporated herein by reference.

FIELD OF INVENTION

This invention relates to a locking system useful in closing and locking the lid of enclosures such as grade level boxes.

BACKGROUND

The present locking assembly provides security for enclosures such as grade level boxes used to contain cable TV equipment, data transmission lines, telephone switching equipment, service lines, power transmission devices, and water meters, for example. The invention also has application to other types of ground level enclosures and similar enclosures generally. The locking assembly provides a means of locking an enclosure by a one-piece locking device without the need for threaded bolts and related fasteners.

SUMMARY OF THE INVENTION

Briefly, one embodiment of the invention comprises a locking assembly for locking a lid to the top of a hollow enclosure. The locking assembly includes a rotatable one-piece locking device that engages a locking surface on an interior wall of the enclosure. The locking surface can be a rim or wall section of the enclosure or a recess formed in an inside wall of the enclosure. The locking assembly may be disposed in and located adjacent an edge of the lid. The locking assembly cooperates with the locking surface inside the enclosure to lock the lid to the top of the enclosure when the lid is placed in a closed position on the enclosure.

In one embodiment, the locking assembly includes an L-bolt disposed in the lid and rotatable between an unlocked position and a locked position. The L-bolt extends through a passage in the lid. The L-bolt has a locking projection located on an underside of the lid and a position adjusting device exposed to the upper surface of the lid. One embodiment of the locking assembly includes a locking piece that fits into the passage around the L-bolt to prevent removal of the L-bolt from the passage in the lid. The L-bolt in its unlocked position allows the lid to fit into a closed position on the enclosure. The L-bolt is rotatable to its locked position by rotating the position adjusting device atop the L-bolt. This rotates the L-bolt and its locking projection underneath the locking surface on the enclosure to a locked position for preventing removal of the lid from the enclosure.

These and other aspects of the invention will be more fully understood by referring to the following detailed description and the accompanying drawings.

BRIEF DESCRIPTION OF THE DRAWINGS

FIGS. 3 and 4 are similar fragmentary perspective views showing the L-bolt being straightened and pushed to the bottom of the bolt recess.

FIG. 5 is a fragmentary perspective view showing the underside of the locking assembly in which the L-bolt is positioned below a slot area of the locking assembly.

FIG. 6 is a perspective view similar to FIG. 5 but showing the L-bolt having been rotated toward the front of the lid.

FIG. 7 is a fragmentary perspective view taken from the underside of the locking assembly as shown in FIG. 1 along with a locking piece to be inserted into the slotted area of the locking system.

FIG. 8 is a perspective view similar to FIG. 7 but showing the locking piece in the process of being inserted into the slotted area of the locking assembly.

FIG. 9 is a perspective view similar to FIG. 8 but showing the locking piece snapped into place in the slotted area of the locking assembly.

FIG. 10 is a perspective view similar to FIG. 9 but showing the L-bolt having been turned to an open position.

FIG. 12 is a top perspective view similar to FIG. 11 showing the locking system installed on a grade level box and rotating toward its locked position.

FIG. 13 is a fragmentary perspective view from the underside of the locking system showing the lock with the L-bolt rotated to lock under a rim of the grade level box.

DETAILED DESCRIPTION OF THE INVENTION

Figure 2:
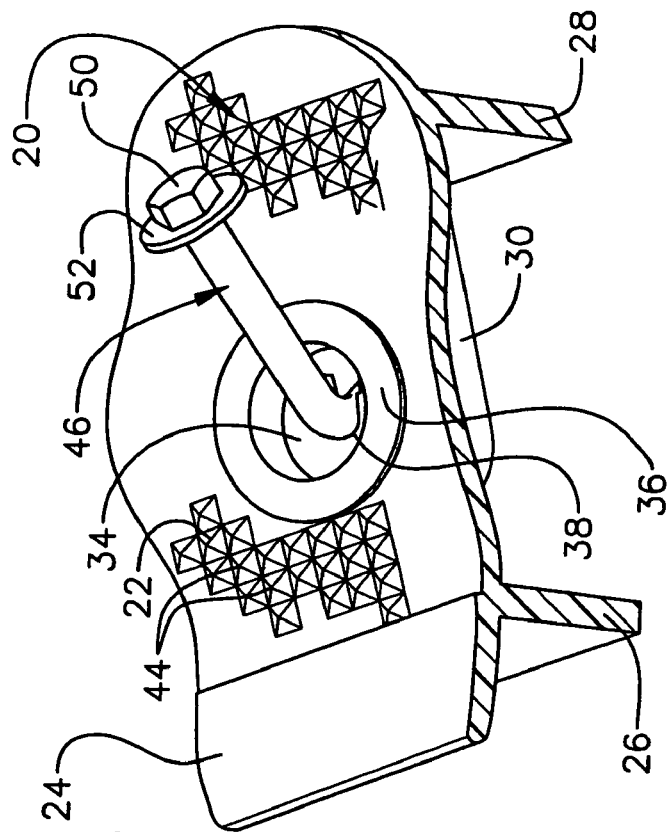
FIG. 2 is a fragmentary perspective view similar to FIG. 1 but showing the L-bolt inserted into the bolt recess.

FIGS. 1-6 illustrate components of a locking system incorporated into a side portion of a lid 20. The lid is preferably made of hard molded plastic. The locking system is formed integrally with a flat rigid top 22 of the lid. The top of the lid has an outwardly projecting flange 24 formed integrally along a front edge of the lid. The flange lies in essentially the same plane as the top of the lid 20.

The lid 20 also includes a pair of spaced apart and parallel elongated ribs 26, 28 projecting down from the underside of the lid. The ribs are formed integrally with the lid and project down on opposite sides of an elongated slot 30 also formed integrally with the lid and projecting down from the underside of the lid. The rear portion of the slot 30 is formed integrally with a front face of the rib 28. The slot is formed by a long narrow wall structure that extends parallel to the axis of the two downwardly projecting ribs 26, 28. A long narrow interior opening 32 in the slot faces downwardly from a bottom of the slot.

A top of the lid 20 has a cup-shaped bolt recess 34 that opens to the top of the lid and projects downwardly from the underside of the lid. The bolt recess has a flanged upper edge 36 that overlies the top of the lid and surrounds the recess. The bottom of the bolt recess also includes a long narrow slotted opening 38 facing upwardly and communicating at its bottom with the hollow interior opening 32 in the narrow slot 30 beneath the lid. A bottom portion 40 of the bolt recess is seated, in part, in a portion of the slot 30 adjacent the bottom surface of the lid. The bolt recess also is formed integrally with an upper portion an elongated axial wall 42 extending below the lid in alignment with the axis of the narrow slot 30. A front portion of the axial wall is formed integrally with the underside of the front rib 26 below the lid. The rear portion of the axial wall is integrally formed with the front side of the slot 30. An optional non-corroding waffle pattern 44 is formed on the top surface 22 of the lid around the upwardly facing flanged top portion of the bolt recess.

Figure 1:
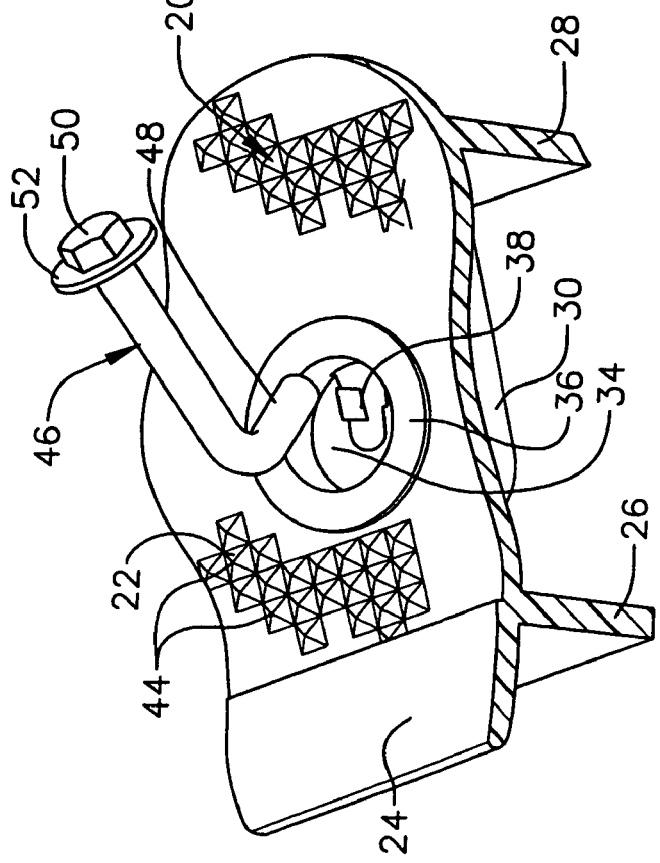
FIG. 1 is a fragmentary perspective view illustrating an L-bolt and bolt recess of a lid having a locking assembly according to principles of this invention.

In use, an L-bolt 46 is inserted at an angle into the slotted opening 38 in the bottom of the bolt recess 34, as shown in FIG. 1. The bottom of the L-bolt includes a right angle leg or locking projection 48. A locking nut 50 and lower flange 52 are integrally formed with the top of the bolt. The L-bolt is a hard metal shaft bent to form the right-angle leg. The bolt is unthreaded, and with the locking nut, it forms a one-piece locking device. The locking projection 48 of the L-bolt is pushed down into the bottom of the bolt recess, as shown in FIG. 2, and the L-bolt is then straightened and pushed to the bottom of the recess, as shown in FIGS. 3 and 4. FIG. 5 shows the locking projection 48 of the L-bolt 46 facing away from the front of the lid 20 when the L-bolt is seated in the bolt recess. In this position, the locking projection is shown extending parallel to the bottom of the slot 30 and spaced below the bottom of the slot. The L-bolt 46 is then rotated to rotate the locking projection 48 to face toward the front of the lid as shown in FIG. 6. In this position, an upper surface of the locking projection is seated under a downwardly projecting lug 54 on the bottom of the axial wall 42 that protrudes below the adjacent wall of the slot 30.

Referring to FIGS. 7-9, a molded plastic locking piece 56 is inserted into the bottom opening 32 in the slot 30 (FIG. 7). The locking piece is then driven up into the slot (FIG. 8) until it snaps in place around the locking projection 48 at the bottom of the L-bolt (FIG. 9). The locking piece 56 has a wall structure 58 that conforms to the shape of and is adapted to make a sliding fit into the hollow opening 32 of the slot 30. The bottom of the locking piece has a flanged portion 60 that fits around the bottom edge of the slot when the locking piece snaps into place in the slot (FIG. 9). The flanged bottom portion of the locking piece also has a pair of forwardly projecting arms 62, 64 that extend around the sides of the locking projection 48 on the L-bolt when the bolt is in the position shown in FIG. 9.

Figure 11:
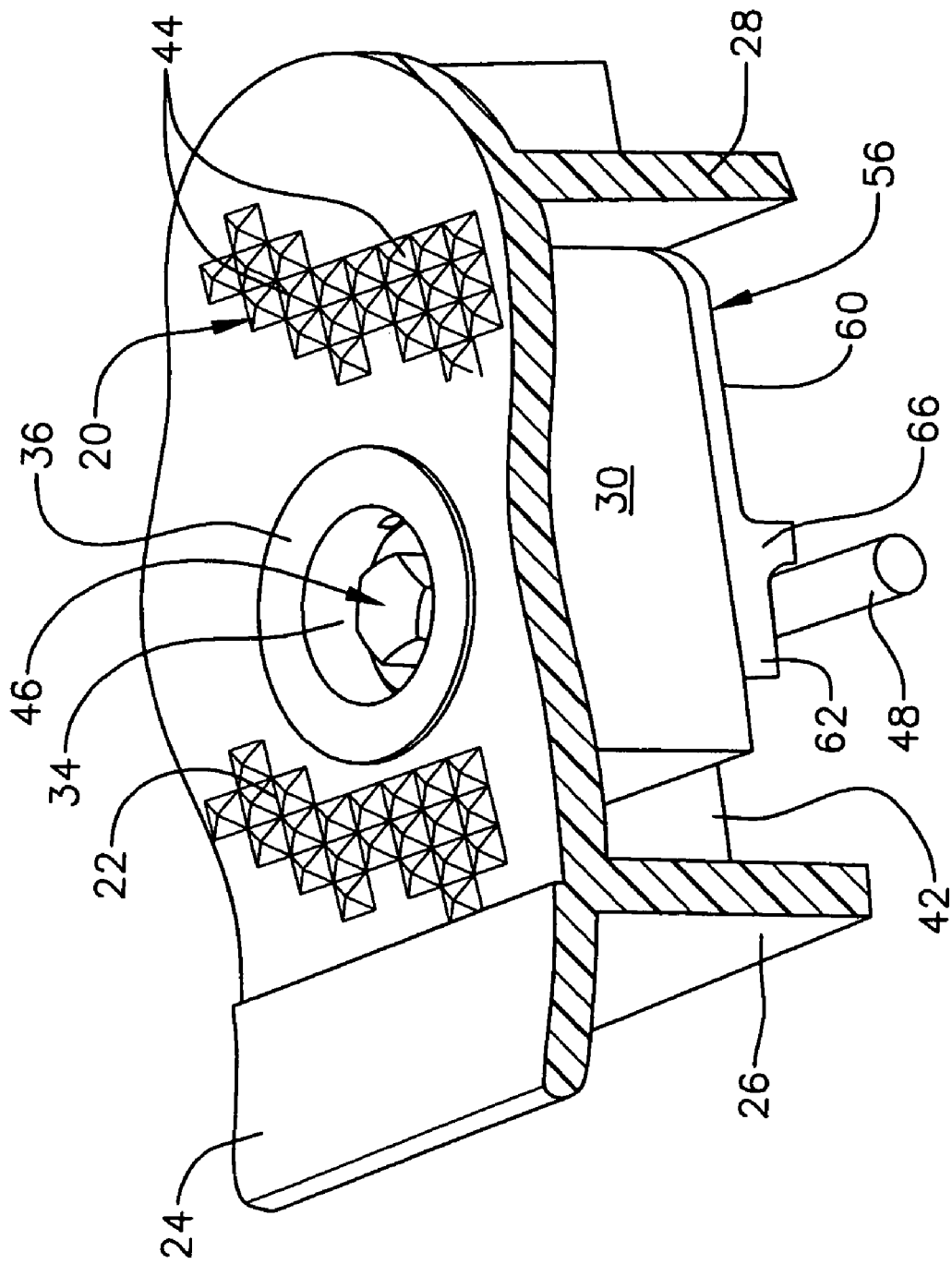
FIG. 11 is a top perspective view showing the locking assembly in the position of FIG. 10 in which the lock and lid are fully assembled.

The L-bolt 56 is then turned (rotated 90 degrees) to an "open" position shown in FIG. 10. Here the locking projection 48 is turned sideways to extend under the locking arm 62 to hold the locking piece 56 in place in the slot. When the L-bolt is rotated to the open position, the locking projection of the L-bolt contacts a shoulder 66 on the locking piece to stop rotation. The lid and locking device are now fully assembled as shown best in FIG. 11 with the locking piece 56 holding the L-bolt 46 in position in the bolt recess 34 and slot 30.

As shown in FIGS. 12 and 13, the locking device, in use, is installed on a lid for a grade level box 68. The lid is positioned so that the flange portion 24 of the lid rests on a top edge 70 of the grade level box. The top edge of the grade level box fits under the flanged portion 24 of the lid and in this position, a rim 72 inside the grade level box faces the bottom of the locking device. The L-bolt 46 is then rotated from the position shown in FIG. 12 to a locked position shown in FIG. 13 in which the locking projection 48 of the L-bolt has rotated under the rim 72 of the grade level box. This illustrates the locked position of the lid secured to the box so that it cannot be removed from the lid. The L-bolt can be rotated between locked and unlocked positions by a proprietary key having a configuration that matches the locking nut or a recessed profile in the locking nut.

FIGS. 12 and 13 show the L-bolt locking the lid to a rim on the inside of the grade level box. The projecting rim provides one example of a locking surface that cooperates with the L-bolt to resist removal of the lid from the box. The locking surface can be in other configurations, such as the top of a recess in a wall section of the enclosure.

Figure 14:
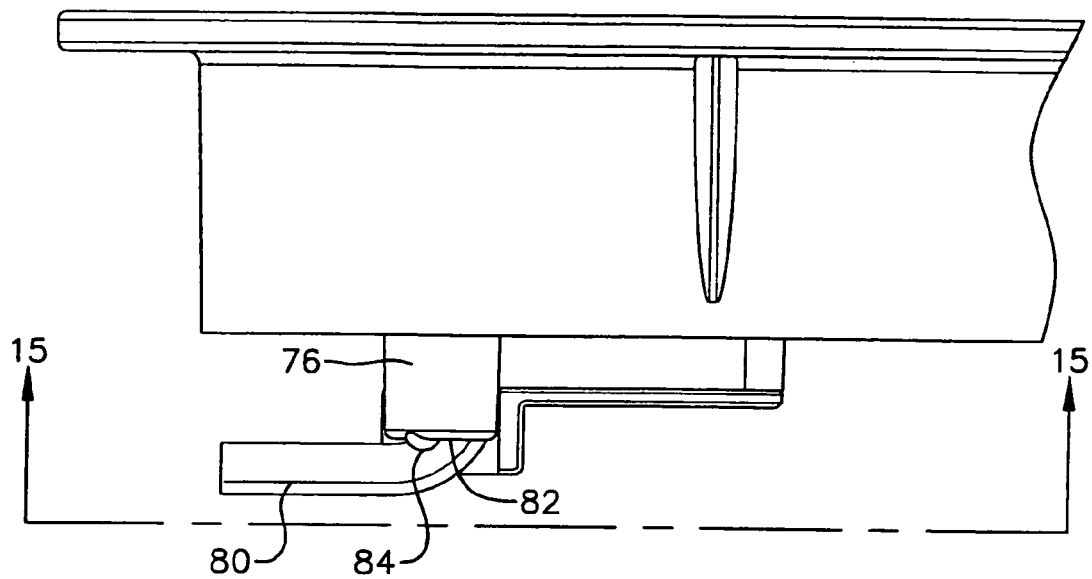
FIG. 14 is a fragmentary side elevational view showing an alternative form of the locking device in a cover plate for an enclosure.
Figure 15:
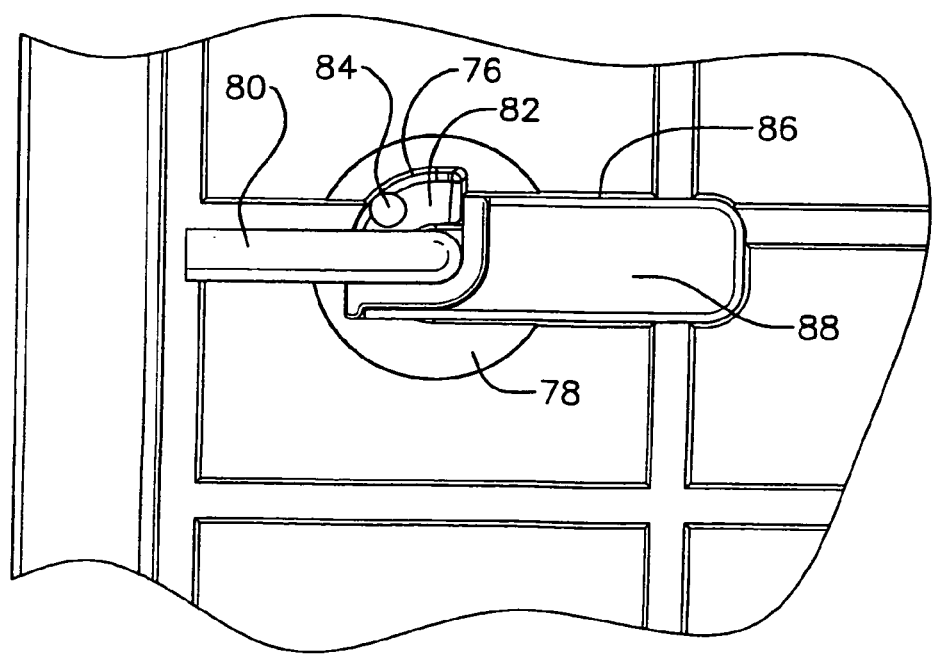
FIG. 15 is a fragmentary bottom elevational view taken on line 15-15 of FIG. 14.
Figure 16:
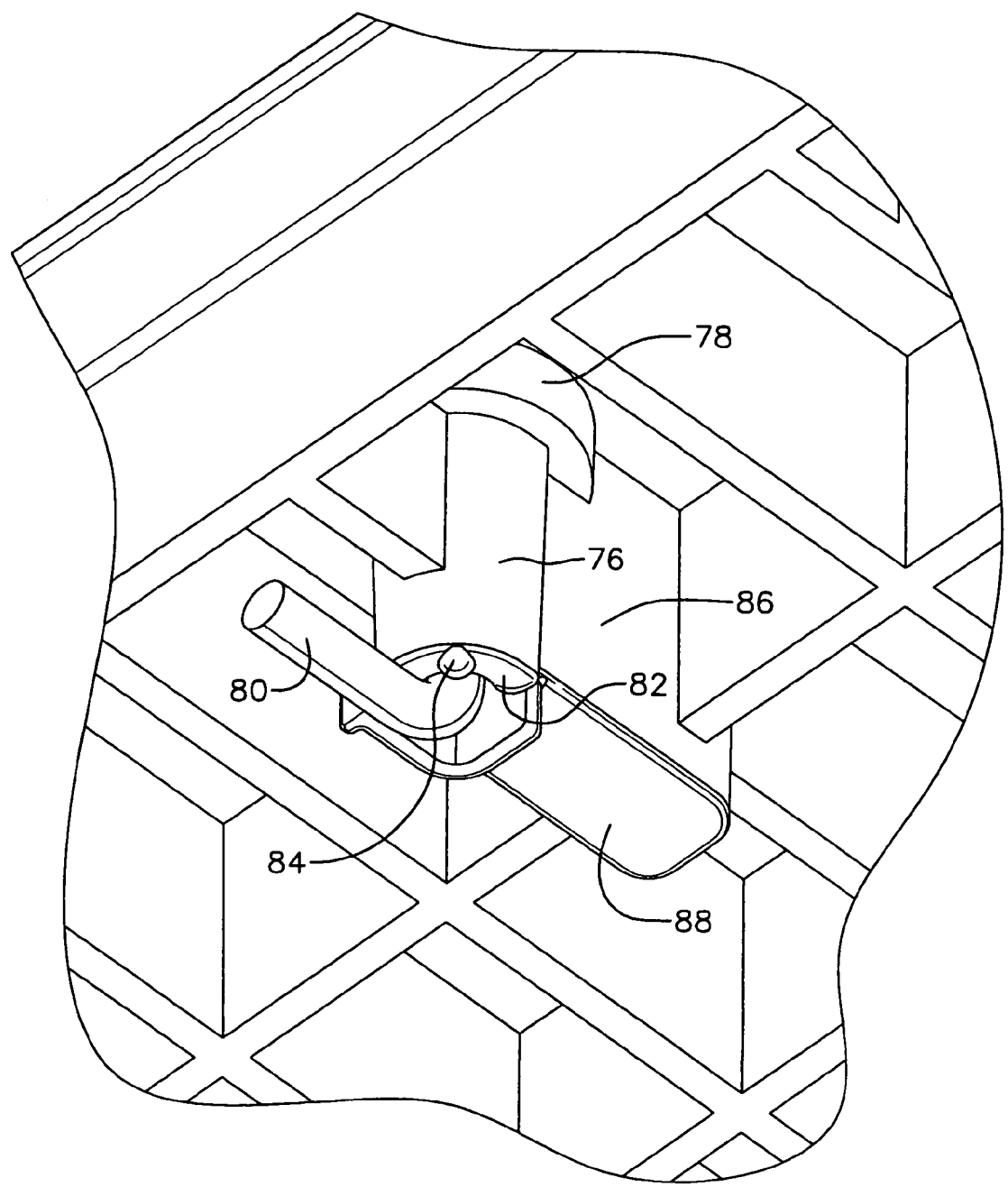
FIG. 16 is a fragmentary bottom perspective view showing the locking device of FIGS. 14 and 15.

FIGS. 14-16 show an alternative form of the locking device. In this embodiment, the upright shaft of the L-bolt extends downwardly through a cylindrical housing 76 which extends below a cup-shaped recess 78 exposed to the upper surface of the lid. The cylindrical housing and recess are integrally molded with the top plate surface of the lid. The locking nut (not shown) on the top of the shaft is disposed in the recess for access from the top side of the lid. The locking projection 80 at the bottom of the L-bolt extends away from the bottom of the cylindrical housing 76. The top of the L-bolt slides across a downwardly facing surface 82 on a curved lower section of the cylindrical housing. A raised area 84 on the surface 82 forms a bump positioned in the path of the locking projection as it rotates about the axis of the L-bolt shaft. Rotation of the L-bolt causes the projection to slide over the bump which provides resistance to rotation of the L-bolt. This produces a definitive locking action in rotation of the L-bolt between the locked and unlocked positions (on opposite sides of the raised area 84) and retains the L-bolt in either position during use.

The embodiment of FIGS. 14-16 also shows an elongated slot 86 similar to the slot 30 and a locking piece 88 disposed in the slot for retaining the L-bolt in the cylindrical housing 76.

Figure 17:
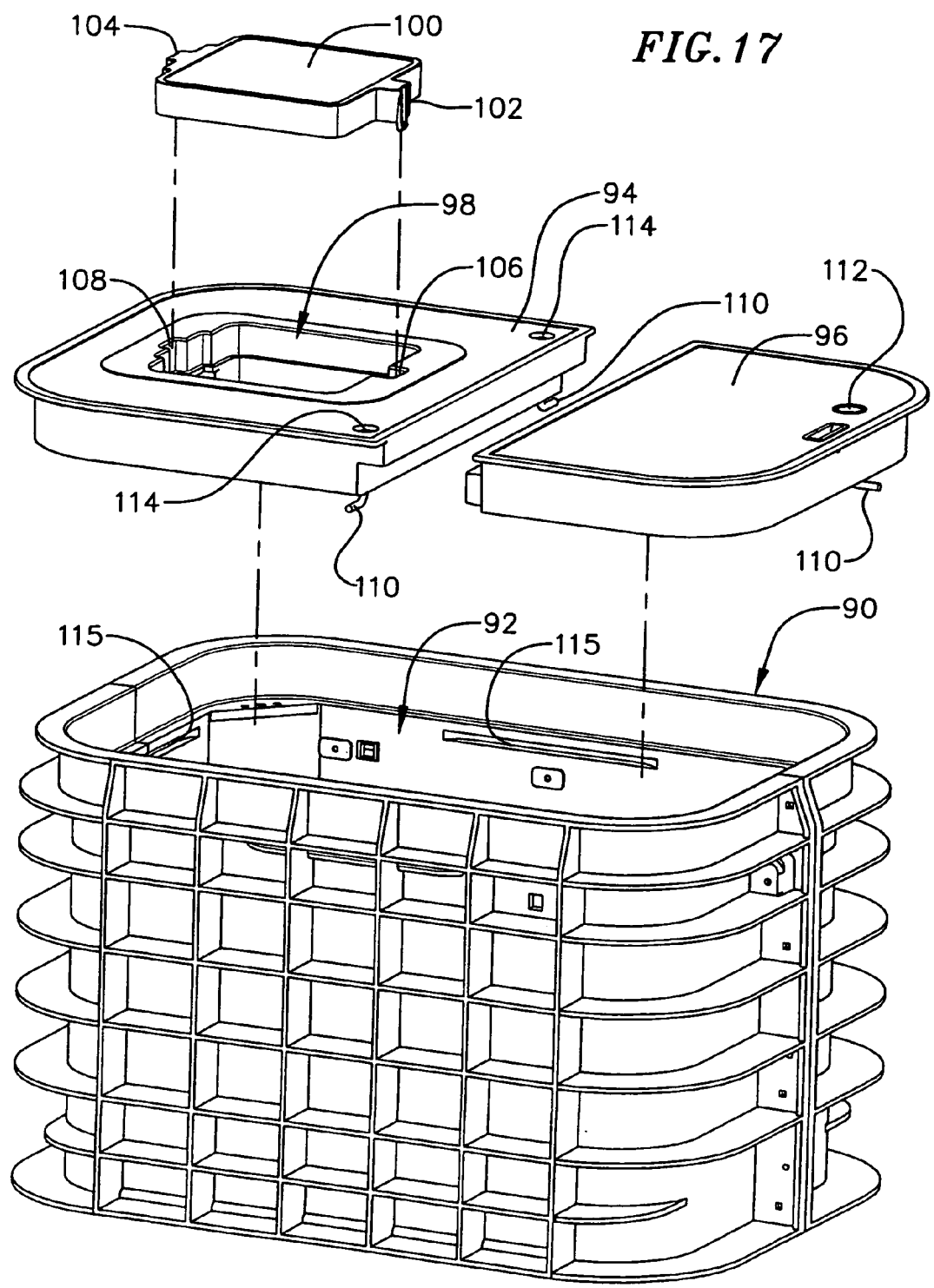
FIG. 17 is an exploded perspective view showing a grade level box and a split cover plate assembly in which the cover plates contain locking devices of this invention for use in locking the cover plates to the top of the grade level box.

FIG. 17 illustrates use of the L-bolt in an enclosure system for underground utility connections. This example shows a grade level box 90 having an upper opening 92 that receives a two-part split cover plate which includes a pedestal section 94 and an adjacent cover section 96. The two cover plates 94 and 96 are mounted over the top of the grade level box to close off the top of the box during use. The pedestal section of the cover plate includes a profiled opening to provide access between the cover plates and the inside of the grade level box when the cover plates are positioned on the box. The opening can be closed off by a plug 100 having an exterior profile that matches the profile of the opening 98 in the plate section 94.

The plug 100 has connectors 102 and 104 at opposite ends which include bendable clips that make a snap lock in cooperating notched sections 106 and 108 at opposite ends of the opening 98. Downward pressure forces the plug into the opening and the clips 102 and 104 to snap lock with the notched regions 106 and 108 of the opening 98 to produce a continuous flat top surface for the split section 94. This connection of the plug to the opening is accomplished without the use of special fasteners or the like via the friction fit provided by the clips at opposite ends of the lid.

When both cover plates are positioned in the opening 92 of the grade level box, the lids are then locked to the box by L-bolts 110. In the illustrated embodiment, an L-bolt is disposed in a recess 112 at one end of the cover plate 96, and two L-bolts are disposed in recessed areas 114 at front corners of the cover plate 94 located adjacent the adjoining cover plate. Elongated slotted openings 115 are located in the inside walls of the box in a position to receive each L-bolt when the cover plates are positioned in the opening of the box. The L-bolts 110 can be rotated into and out of the locked position which rotates the locking projections at the ends of the L-bolts into and out of engagement with elongated slotted openings 115.

Figure 18:
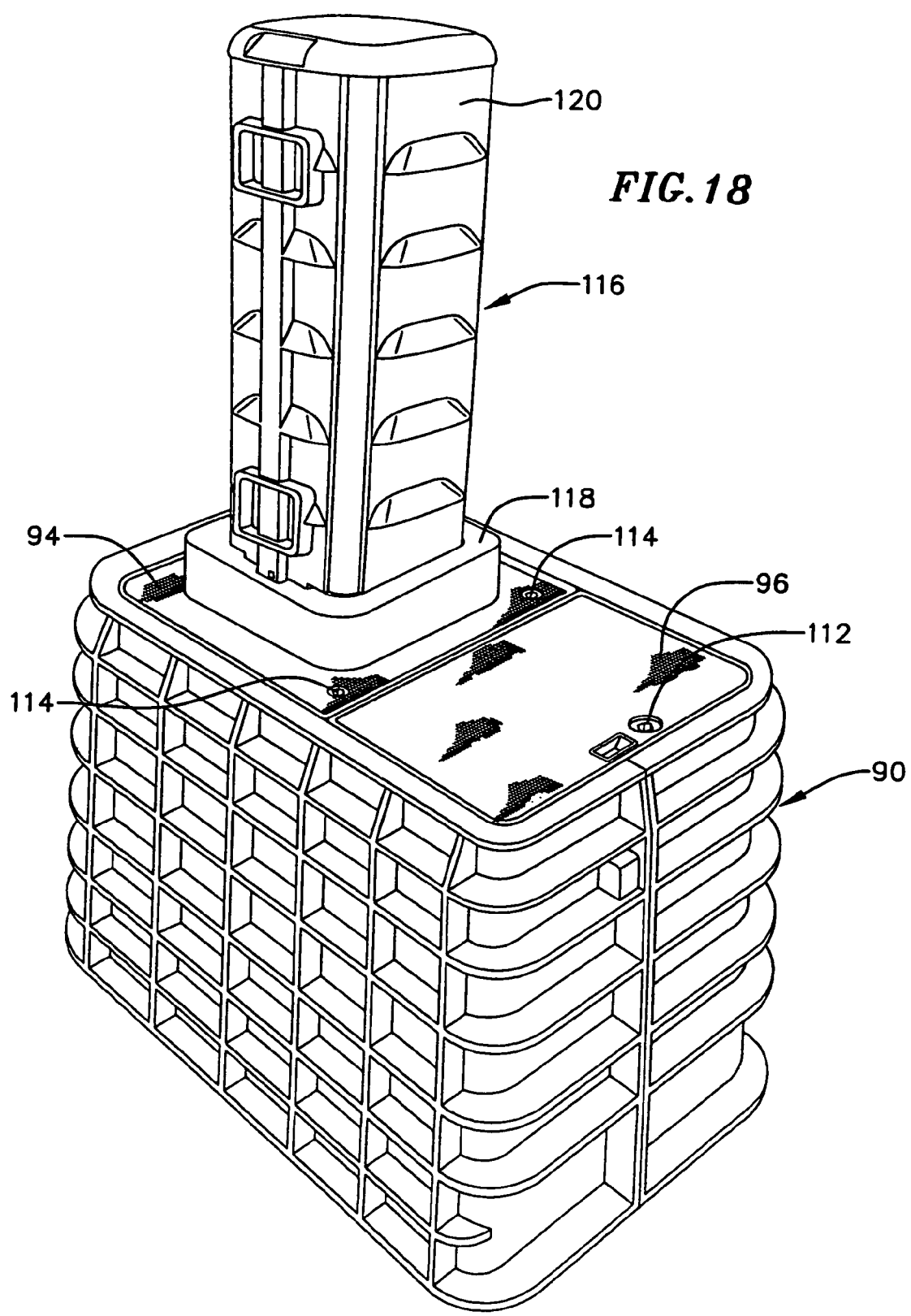
FIG. 18 is a perspective view showing an assembled form of the apparatus of FIG. 17 with a pedestal housing mounted on the cover plates of the grade level box and showing the locking devices of this invention positioned for locking the cover plates to the top of the grade level box.

FIG. 18 shows the L-bolts in a position having locked the plates 94 and 96 to the top of the grade level box 90. In this instance, the plug 100 has been removed from the cover plate 94 and a pedestal housing assembly 116 has been positioned above the cover plate section 94. The pedestal assembly includes a lower base structure 118 with an opening that aligns with the opening 98 of the cover plate 94. The lower base structure 118 contains releasable fastening devices for snap locking the base structure into the opening 98. The pedestal housing enclosure further includes a pedestal cover 120 that releasably mounts over the opening in the lower support structure 118 to enclose any electrical connections made inside the pedestal cover.

What is claimed is:

1. An equipment enclosure assembly including a hollow enclosure, a lid for removably closing the top of the enclosure, and a locking assembly for locking the lid to the enclosure for securely locking equipment inside the enclosure, in which the enclosure has a locking surface on an inside wall of the enclosure, the locking assembly disposed in and located adjacent an edge of the lid for cooperating with the locking surface inside the enclosure, the locking assembly including an L-bolt rotatably disposed in the lid, the L-bolt rotatable between an unlocked position and a locked position, the locking assembly further including a slotted structure affixed to an underside of the lid, the slotted structure projecting downwardly away from the underside of the lid to a downwardly facing opening on the slotted structure which is spaced below the lid and positioned adjacent the locking surface, the L-bolt extending through a passage in the lid and the slotted structure on the underside of the lid, the L-bolt having (1) a locking projection located on the underside of the lid adjacent the locking surface and (2) a position adjusting device exposed to an upper surface of the lid, the locking assembly further including a separate locking piece inserted into the downwardly facing opening and into the passage in the slotted structure and positioned around the L-bolt to prevent removal of the L-bolt from the exterior of the lid once the L-bolt is positioned in the passage through the slotted structure, the L-bolt in its unlocked position allowing the lid to fit into a closed position on the enclosure, the L-bolt rotatable to its locked position by rotating the position adjusting device atop the L-bolt to thereby rotate the L-bolt and therefore the locking projection under the locking surface so that the locking projection can prevent removal of the lid from the enclosure, and in which the locking piece includes a flange that restricts rotation of the L-bolt when the L-bolt is moved between the locked and unlocked positions.

2. The equipment enclosure according to claim 1 in which the enclosure comprises a grade level box with an opening in the bottom for receiving underground utility connections inside the enclosure.

3. The equipment enclosure according to claim 2 in which the lid comprises a split cover plate having separate cover sections, and the locking assembly is positioned in at least one of the cover sections for locking the at least one cover section to the grade level box.

4. The equipment enclosure according to claim 3 including a utility pedestal housing positioned over an opening in the cover section locked to the grade level box to receive the utility connections inside the pedestal housing.

5. The equipment enclosure according to claim 2 including a utility pedestal housing positioned over an opening in the lid for receiving the utility connections inside the pedestal housing.

6. The equipment enclosure according to claim 1 in which the locking assembly further includes a recess that opens toward the top surface of the lid, and in which the position adjusting device is contained within the recess.

7. The equipment enclosure according to claim 6 in which the slotted structure is formed integrally with the underside of the lid and the recess is formed integrally with the slotted structure and the underside of the lid.

8. The equipment enclosure according to claim 1 in which the locking assembly further includes a recess that opens toward the top surface of the lid, and in which the position adjusting device is contained within the recess.

9. The equipment enclosure according to claim 8 in which the slotted structure is formed integrally with the underside of the lid and the recess is formed integrally with the slotted structure and the underside of the lid.

10. An equipment enclosure assembly for buried placement near grade level, including a grade level box having a hollow enclosure, the grade level box having an opening in the bottom for receiving underground utility equipment, a lid for removably closing the top of the enclosure, and a locking assembly for locking the lid to the enclosure for securely locking underground utility equipment inside the enclosure, in which the enclosure has a locking surface on an inside wall of the enclosure, the locking assembly disposed in and located adjacent an edge of the lid for cooperating with the locking surface inside the enclosure, the locking assembly including an L-bolt rotatably disposed in the lid, the L-bolt rotatable between an unlocked position and a locked position, the locking assembly further including a slotted structure affixed to an underside of the lid, the slotted structure projecting downwardly away from the underside of the lid to a downwardly facing opening on the slotted structure which is spaced below the lid and positioned adjacent the locking surface, the L-bolt extending through a passage in the lid and the slotted structure on the underside of the lid, the L-bolt having (1) a locking projection located on the underside of the lid adjacent the locking surface and (2) a position adjusting device exposed to an upper surface of the lid, the locking assembly further including a separate locking piece inserted into the downwardly facing opening and into the passage in the slotted structure and positioned around the L-bolt to prevent removal of the L-bolt from the exterior of the lid once the L-bolt is positioned in the passage through the slotted structure, the L-bolt in its unlocked position allowing the lid to fit into a closed position on the enclosure, the L-bolt rotatable to its locked position by rotating the position adjusting device atop the L-bolt to thereby rotate the L-bolt and therefore the locking projection under the locking surface so that the locking projection can prevent removal of the lid from the enclosure, and in which the locking piece includes a flange that restricts rotation of the L-bolt when the L-bolt is moved between the locked and unlocked positions.

11. The equipment enclosure according to claim 10 in which the lid comprises a split cover plate having separate cover sections, and the locking assembly is positioned in at least one of the cover sections for locking the at least one cover section to the grade level box.

12. The equipment enclosure according to claim 11 including a utility pedestal housing positioned over an opening in the cover section locked to the grade level box to receive the underground utility equipment inside the pedestal housing.

13. The equipment enclosure according to claim 10 including a utility pedestal housing positioned over an opening in the lid for receiving the underground utility equipment inside the pedestal housing.

* * * * *